(12) United States Patent
Warkhedi et al.

(10) Patent No.: US 11,522,755 B1
(45) Date of Patent: Dec. 6, 2022

(54) AUTOMATED PROVISIONING OF ENDPOINT DEVICES WITH MANAGEMENT CONNECTIVITY

(71) Applicant: Cisco Technology, Inc., San Jose, CA (US)

(72) Inventors: Abhijit Vijay Warkhedi, Milpitas, CA (US); Sean Hagan, Wilton, CT (US); Michael Goff, San Jose, CA (US); Sreesha Kudoor, Karnataka (IN); Sabari Girish S, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/531,193

(22) Filed: Nov. 19, 2021

Related U.S. Application Data

(60) Provisional application No. 63/223,475, filed on Jul. 19, 2021.

(51) Int. Cl.
  *G06F 15/177*  (2006.01)
  *H04L 41/0806* (2022.01)
  *H04L 41/12*   (2022.01)
  *G06F 9/455*   (2018.01)

(52) U.S. Cl.
  CPC ...... *H04L 41/0806* (2013.01); *G06F 9/45558* (2013.01); *H04L 41/12* (2013.01); *G06F 2009/45595* (2013.01)

(58) Field of Classification Search
  CPC . H04L 41/0806; H04L 41/12; G06F 9/45558; G06F 2009/45595
  See application file for complete search history.

(56) References Cited

U.S. PATENT DOCUMENTS

| | | |
|---|---|---|
| 2016/0241701 A1 | 8/2016 | Gray et al. |
| 2019/0238539 A1 | 8/2019 | Arora et al. |
| 2020/0067915 A1 | 2/2020 | Kumar et al. |
| 2020/0162318 A1 | 5/2020 | Patil et al. |
| 2021/0184936 A1 | 6/2021 | Mutnuru et al. |
| 2022/0229604 A1* | 7/2022 | Black .......... G06F 3/0604 |

* cited by examiner

*Primary Examiner* — Wing F Chan
*Assistant Examiner* — Joseph R Maniwang
(74) *Attorney, Agent, or Firm* — Lee & Hayes, P.C.

(57) ABSTRACT

Techniques for automating the provisioning, configuring, and onboarding of network devices into a cloud management platform. The cloud management platform can be used to manage network devices that are provisioned in on-premise environments, cloud environments, and/or hybrid environments. However, it can be a cumbersome and error-prone process for a user to manually configure each of the network devices with connectivity settings needed to be managed by the cloud management platform. The techniques described herein provide an automated process to distribute connectivity information to the network devices to allow them to be managed by the cloud management platform. Once connected to the cloud management platform, the techniques described herein further include automating the process for attaching the network devices with the appropriate user account registered with the cloud management platform.

20 Claims, 7 Drawing Sheets

```
                                    500
                                        ↘

┌─────────────────────────────────────────────────────────────────────┐
    │  RECEIVE, FROM A FABRIC INTERCONNECT, AN ADVERTISEMENT MESSAGE THAT │
    │              WAS SENT USING A DISCOVERY PROTOCOL                    │
    │                              502                                    │
    └─────────────────────────────────────────────────────────────────────┘
                                    │
                                    ▼
    ┌─────────────────────────────────────────────────────────────────────┐
    │ RECEIVE, FROM THE FABRIC INTERCONNECT, A SIGNED SECURITY DIGEST THAT HAS │
    │  BEEN SIGNED BY A PRIVATE KEY ASSOCIATED WITH THE FABRIC INTERCONNECT │
    │                              504                                    │
    └─────────────────────────────────────────────────────────────────────┘
                                    │
                                    ▼
    ┌─────────────────────────────────────────────────────────────────────┐
    │     IDENTIFY, FROM THE ADVERTISEMENT MESSAGE, CONTACT INFORMATION    │
    │   ASSOCIATED WITH CONTACTING A DISCOVERY SERVICE ASSOCIATED WITH THE │
    │   NETWORK FABRIC, WHEREIN THE DISCOVERY SERVICE PROVIDES CONNECTIVITY│
    │      INFORMATION FOR CONNECTING TO A NETWORK MANAGEMENT PLATFORM     │
    │                              506                                    │
    └─────────────────────────────────────────────────────────────────────┘
                                    │
                                    ▼
    ┌─────────────────────────────────────────────────────────────────────┐
    │ USING THE CONTACT INFORMATION, OBTAIN THE CONNECTIVITY INFORMATION FROM │
    │                       THE DISCOVERY SERVICE                         │
    │                              508                                    │
    └─────────────────────────────────────────────────────────────────────┘
                                    │
                                    ▼
    ┌─────────────────────────────────────────────────────────────────────┐
    │   ESTABLISH A CONNECTION BETWEEN THE ENDPOINT DEVICE AND THE NETWORK │
    │       MANAGEMENT PLATFORM USING THE CONNECTIVITY INFORMATION        │
    │                              510                                    │
    └─────────────────────────────────────────────────────────────────────┘
                                    │
                                    ▼
    ┌─────────────────────────────────────────────────────────────────────┐
    │   SEND THE SIGNED SECURITY DIGEST TO THE NETWORK MANAGEMENT PLATFORM │
    │                              512                                    │
    └─────────────────────────────────────────────────────────────────────┘
```

FIG. 5

AUTOMATED PROVISIONING OF ENDPOINT DEVICES WITH MANAGEMENT CONNECTIVITY

CROSS REFERENCE TO RELATED APPLICATIONS

This application claims priority to U.S. Provisional Patent Application No. 63/223,475, filed Jul. 19, 2021, the entire contents of which are incorporated herein by reference.

TECHNICAL FIELD

The present disclosure relates generally to a cloud management platform that performs techniques for provisioning network devices in a network fabric and establishing connectivity between the cloud management platform and the network devices

BACKGROUND

Cloud management platforms are used to provide visualization, optimization, and orchestration for applications and infrastructure across on-premise environments, cloud environments, and/or hybrid environments. The cloud management platforms may be Software-as-a-Service (SaaS) platforms that automate many tasks on behalf of users, and optimize traditional and cloud-native applications and infrastructure. For instance, cloud management platforms can provide lifecycle management of distributed infrastructure and workloads across data centers, remote sites, branch offices, and edge environments, which allows users to analyze, update, fix, and automate an application environment.

Cloud management platforms can be used to provide centralized management capabilities to unified computing system (UCS) domains across one or more data centers. In order to communicate with devices in these domains, each device may run a software agent (referred to herein as "agent") that is used to help provision, configure, and manage network devices in the data centers (e.g., servers, Input/Output (IO) modules, appliance, virtual machines (VMs), switches, routers, etc.).

In order to provision network devices in the domains, the agents running on the network devices generally initiate web-socket connections to the cloud management platform either directly or through a proxy. Because the connections to the cloud management platform are initiated from within the data center, secure web socket connections (e.g., Transport Layer Security (TLS) connections) can be established to the cloud management platform without having to interfere with any firewalls. Once the connections are established, the devices are registered into an onboarding account with the cloud management platform, and a user can then claim their network devices into their user accounts using time-bound, one-time tokens that are acquired from their devices (e.g., through a command line interface (CLI), user interface (UI) dashboard, etc.) in order to authenticate access to the network devices.

In some instances, a UCS domain can include one or more fabric interconnects (FIs) (e.g., a pair of switches) that are connected to racks of servers and/or chassis with blade components that are within the domain. In such an architecture, the cloud management platform may be responsible for discovery, setup, and provisioning of the devices within the domain. However, each UCS domain may include relatively large amounts of devices (e.g., hundreds of servers, tens of switches, etc.), and it would be operationally challenging, as well as time-consuming and cumbersome, for a user to manually configure various connectivity settings on each of the devices. Similarly, it would be error prone and cumbersome for a user to claim each network device into their user account registered with the cloud management platform.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 5 illustrates a flow diagram of an example method for automatically provisioning, configuring, and onboarding an endpoint with a cloud management platform.

DESCRIPTION OF EXAMPLE EMBODIMENTS

Overview

Figure 1:
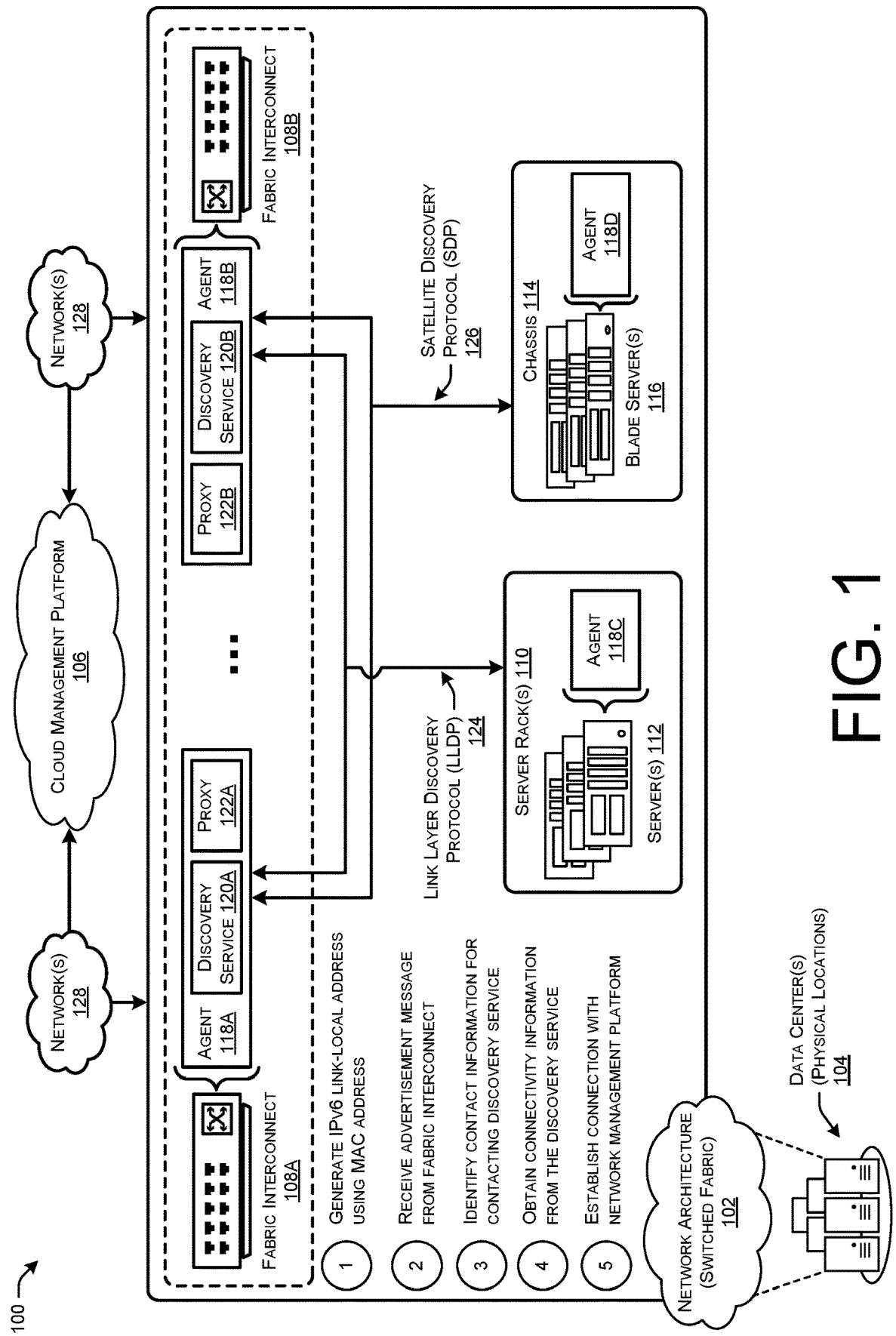
FIG. 1 illustrates a system-architecture diagram of an example switched fabric in which server devices are automatically provisioned and configured for management by a cloud management platform.

This disclosure describes techniques for automating the provisioning, configuring, and onboarding of network devices into a cloud management platform.

The techniques may include a first method performed by an endpoint device (e.g., server, an I/O Module fabric extender, etc.). The first method may include generating, at the endpoint device, an Internet Protocol version 6 (IPv6) link-local address using a Media Access Control (MAC) address of the endpoint device, and receiving, at the endpoint device, an advertisement message that was sent using a discovery protocol. The first method may further include identifying, from the advertisement message, contact information associated with contacting a discovery service associated with the network fabric. Generally, the discovery service provides connectivity information for connecting to a cloud management platform. Further, the first method may include using the contact information, obtaining the connectivity information from the discovery service, and establishing a connection between the endpoint device and the cloud management platform using the connectivity information and the IPv6 link-local address.

In some instances, the techniques may include a second method performed by an endpoint device (e.g., server, an I/O Module fabric extender, etc.). The second method may include receiving, at the endpoint device and from a fabric interconnect, an advertisement message that was sent using a discovery protocol. The second method may further include receiving, from the fabric interconnect, a signed security digest that has been signed by a private key associated with the fabric interconnect. The second method may further include identifying, from the advertisement message, contact information associated with contacting a discovery service associated with the network fabric. Generally, the discovery service provides connectivity information for connecting to a cloud management platform. Further, the second method may include using the contact information, obtaining the connectivity information from the discovery service, and establishing a connection between the endpoint device and the cloud management platform using the connectivity information. Further, the second method may include sending the signed security digest to the cloud management platform.

Additionally, the techniques described in this disclosure may be performed as a method and/or by a system having non-transitory computer-readable media storing computer-executable instructions that, when executed by one or more processors, performs the techniques described above.

Example Embodiments

This disclosure describes techniques for automating the provisioning, configuring, and onboarding of network devices into a cloud management platform. The cloud management platform can be used to manage network devices that are provisioned in on-premise environments, cloud environments, and/or hybrid environments. However, it can be a cumbersome and error-prone process for a user to manually configure each of the network devices with connectivity settings needed to be managed by the cloud management platform. The techniques described herein provide an automated process to distribute connectivity information to the network devices to allow them to be managed by the cloud management platform. Once connected to the cloud management platform, the techniques described herein further include automating the process for attaching the network devices with the appropriate user account registered with the cloud management platform.

When a server is connected to another device (e.g., a switch) in a UCS domain, such as a data center, the server needs to be configured with connectivity settings that enable the server to communicate with the cloud management platform.

To automate the process for configuring and registering network devices with a cloud management platform, a network device that is connected into a network fabric may self-assign an IP version 6 (IPv6) link-local address using a media access control (MAC) address of the network device. For instance, when a server or host boots up, it may create an IPv6 link-local address from a MAC identifier of the server according to various techniques described in the Request for Comments (RFC) 4291 published by the Internet Engineering Task Force (ETF).

Generally, a UCS domain in a data center may include one or more fabric interconnects (e.g., switches, I/O module fabric extenders, etc.) behind which are disposed a plurality of servers and/or blade servers. When a server and/or blade server (referred to herein as "server") is connected to a fabric interconnect, the server may self-assign an IPv6 link-local IPv6 address and listen on the connection to the fabric interconnect. The fabric interconnect may utilize discovery protocols, such as Link Layer Discovery Protocol (LLDP), Satellite Discovery Protocol (SDP), etc., to advertise various information about an Endpoint Discovery Service (EPDS) that is running the switched network fabric. For instance, the fabric interconnect may advertise one or more LLDP packets that include attributes such as one or more Type-Length-Values (TLVs) and/or sub-TLVs that are used to propagate or advertise contact information that is usable to contact the EPDS.

The EPDS may be running on any device in the switching fabric, including the fabric interconnect itself. Upon receiving the advertisement message(s), the server may identify the contact information that is usable to contact the EPDS, such as a network used to contact the EPDS (e.g., a virtual local area network (VLAN)), an IP address of the EPDS, and/or a port of the EPDS. In some instances, the EPDS may be a web-service that is embedded in an agent that is running on the fabric interconnect, but in some instances, the EPDS may be hosted outside the fabric interconnect.

Generally, the EPDS acts or serves as a directory service that provides cloud management platform connectivity information to the endpoints/devices connected in the switching fabric (e.g., connected to fabric interconnects). The sever may use the contact information to reach the EPDS by setting up a management interface on the advertised VLAN and obtains connectivity information from the EPDS that is usable to establish a connection with the cloud management platform. The server may then establish a connection with the cloud management platform using the connectivity information received from, or obtained from, the EPDS.

In some instances, this disclosure may include techniques for automating and streamlining the onboarding of devices into a user account that is registered with the cloud management platform. For instance, when the server is started up, the server (e.g., child) may request "parent" configuration details from the fabric interconnect. The parent configuration details may include a Domain Name Service (DNS) of the cloud management platform, IP and port information for a proxy running on that fabric interconnect, a unique identifier of the parent FI that is used by the cloud management platform, and a time-bound security digest that has been signed by the private key of the parent fabric interconnect. This information allows the child/server to inherit connectivity information from the parent FI as well as a means to authenticate itself to the cloud management platform. For instance, the child/server uses the parent configuration to connect to the cloud management platform DNS via the proxy. The child/server is connected or attached directly to the parent FI, and thus can gain access to the configuration details of the parent FI.

The cloud management platform is then able to authenticate the connection request from the child/server by using the public key of the parent FI to validate the signed security digest sent from the child/server. Then, the server/child is registered and claimed into the same user account as the parent FI in the cloud management platform. In this way, each server or other network device that is introduced to a switching fabric can be registered and claimed into the same user account as the parent FI devices such that users do not need to manually authenticate and claim their devices that are being provisioned. To manage all of the devices for a user, the devices must be onboarded with a user account that is registered with the cloud management platform. It is critical that parent devices (e.g., FIs, switches, etc.) are onboarded in or registered with the same user account as child devices (e.g., servers, blade servers, etc.). In order to ensure that a device is installed, set up, and being managed by the cloud management platform on behalf of a user, the devices need to be claimed by the user account (e.g., onboarded into the account). While users can manually claim a device, this can take a significant amount of time when many devices need to be claimed. The techniques described herein include techniques for automating the onboarding of devices with the correct user account (e.g., the user account with which the parent devices are onboarded).

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram 100 of an example network architecture 102 (e.g., switched fabric) in which server devices are automatically provisioned and configured for management by a cloud management platform.

Generally, the network architecture 102 may include devices that are housed or located in one or more data centers 104 that may be located at different physical locations. For instance, the network architecture 102 may be supported by networks of devices in a public cloud computing platform, a private/enterprise computing platform, a hybrid computing platform, and/or any combination thereof. The one or more data centers 104 may be physical facilities or buildings located across geographic areas that are designated to store networked devices that are part of the network architecture 102. The data centers 104 may include various networking devices, as well as redundant or backup components and infrastructure for power supply, data communications connections, environmental controls, and various security devices. In some examples, the data centers 104 may include one or more virtual data centers which are a pool or collection of cloud infrastructure resources specifically designed for enterprise needs, and/or for cloud-based service provider needs. Generally, the data centers 104 (physical and/or virtual) may provide basic resources such as processor (CPU), memory (RAM), storage (disk), and networking (bandwidth). However, in some examples the devices in the network architecture 102 may not be located in explicitly defined data centers 104 and, rather, may be located in other locations or buildings.

The switched fabric 102 may include a domain of network devices located in one or more data centers 104, including various hardware devices and/or virtualized components. For instance, the switched fabric 102 may include one or more fabric interconnects 108A, 108B, etc., where the fabric interconnects 108 provide network connectivity and management capabilities to attached devices. The attached devices may include one or more servers located in one or more server racks 110, one or more blade serves 116 disposed in one or more chassis 114. The fabric interconnects 108 may be various types of devices, such as switches, network extenders, and so forth.

Generally, the devices in the domain(s) of the data center(s) 104 may each run an agent 118A-118D where the agent acts as a device connector that enables the devices to communicate with, and be managed by, a cloud management platform 106. The agents 118 generally enable the devices in the UCS domain (e.g., fabric interconnects 108, servers 112, blade servers 116, etc.) to be managed and monitored by the cloud management platform 106. The cloud management platform 106 may generally be a management system or platform that delivers visualization, optimization, and orchestration for applications and infrastructure of users' computing environments.

In order to register the devices in the data center(s) 104 with the cloud management platform 106, the devices generally need various connectivity settings configured, such as proxy settings, and be provided with connectivity information. To automate the process for configuring and registering the servers 112/116 (and/or other network devices) with the cloud management platform 106, the servers 112/116 that are connected in the switched fabric 102 may self-assign IPv6 link-local addresses using respective MAC addresses of the servers 112/116. For instance, when a server or host boots up, it may create an IPv6 link-local address from a MAC identifier of the server according to various techniques described in the Request for Comments (RFC) 4291 published by the Internet Engineering Task Force (ETF).

When a server 112/116 is connected to a fabric interconnect 108, the server 112/116 may self-assign an IPv6 link local IPv6 address and listen on the connection to the fabric interconnect 108. The fabric interconnect 108 may utilize discovery protocols, such as Link Layer Discovery Protocol (LLDP) 124 (e.g., for servers 112), Satellite Discovery Protocol (SDP) 126 (e.g., for blade servers), etc., to advertise various information about an Endpoint Discovery Service (EPDS) 120A/120B that is running the switched fabric 102. For instance, the agents 118A/118B running on the fabric interconnects 108 may advertise one or more LLDP packets that include attributes such as one or more Type-Length-Values (TLVs) and/or sub-TLVs that are used to propagate or advertise contact information that is usable to contact the discovery service 120.

The discovery service 120 may be running on any device in the switched fabric 102, including the fabric interconnects 108 themselves (e.g., running in the agents 118). Upon receiving the advertisement message(s), the server 112/116 may identify the contact information that is usable to contact the discovery service 120, such as a network used to contact the EPDS (e.g., a VLAN), an IP address of the discovery service 120, and/or a port of the discovery service 120. In some instances, the discovery service 120 may be a web-service that is embedded in the agents 118 that is running on the fabric interconnects 108, but in some instances, the discovery service 120 may be hosted outside the fabric interconnects 108.

Generally, the discovery service 120 acts or serves as a directory service that provides cloud management platform 106 connectivity information to the endpoints/devices connected in the switched fabric 102 (e.g., connected to fabric interconnects 108). The sever 112/116 may use the contact information to reach the discovery service 120 by setting up a management interface on the advertised VLAN and obtain connectivity information from the discovery service 120 that is usable to establish a connection with the cloud management platform 106. The server 112/116 may then establish a connection with the cloud management platform 106 using the connectivity information received from, or obtained from, the discovery service 120.

Generally, in order to establish a connection to the cloud management platform 106, the servers 112/116 may utilize a local proxy 122A/122B that is running in or embedded in the agent 118. The proxy 122A/122B may extend the web-socket and TLS connectivity to one or more external networks 128, and thereby providing connectivity to the cloud management platform 106. The proxy 122A/122B may be converted to proxy communications from the link-local addressing of the switched fabric 102 to communicate over the external network(s) 128. The proxy 122A/122B may, in some examples, be chained behind a Hypertext Transfer Protocol (HTTP) proxy that provides access outside of the data center 102 in restricted environments.

The external network(s) 128 include one or more networks implemented by any viable communication technology, such as wired and/or wireless modalities and/or technologies. The external network(s) 128 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)— both centralized and/or distributed—and/or any combination, permutation, and/or aggregation thereof. The external network(s) 128 may include devices, virtual resources, or other nodes that relay packets from one network segment to another by nodes in the computer network.

In some examples, the switched fabric 102 may include various types of devices configured to communicate using various communication protocols (e.g., VPN, SSL, TLS, DTLS, and/or any other protocol) over the networks external network(s) 128. For instance, the endpoints may comprise personal user devices (e.g., desktop computers, laptop computers, phones, tablets, wearable devices, entertainment devices such as televisions, etc.), network devices (e.g., servers, routers, switches, access points, etc.), and/or any other type of computing device.

Figure 2:
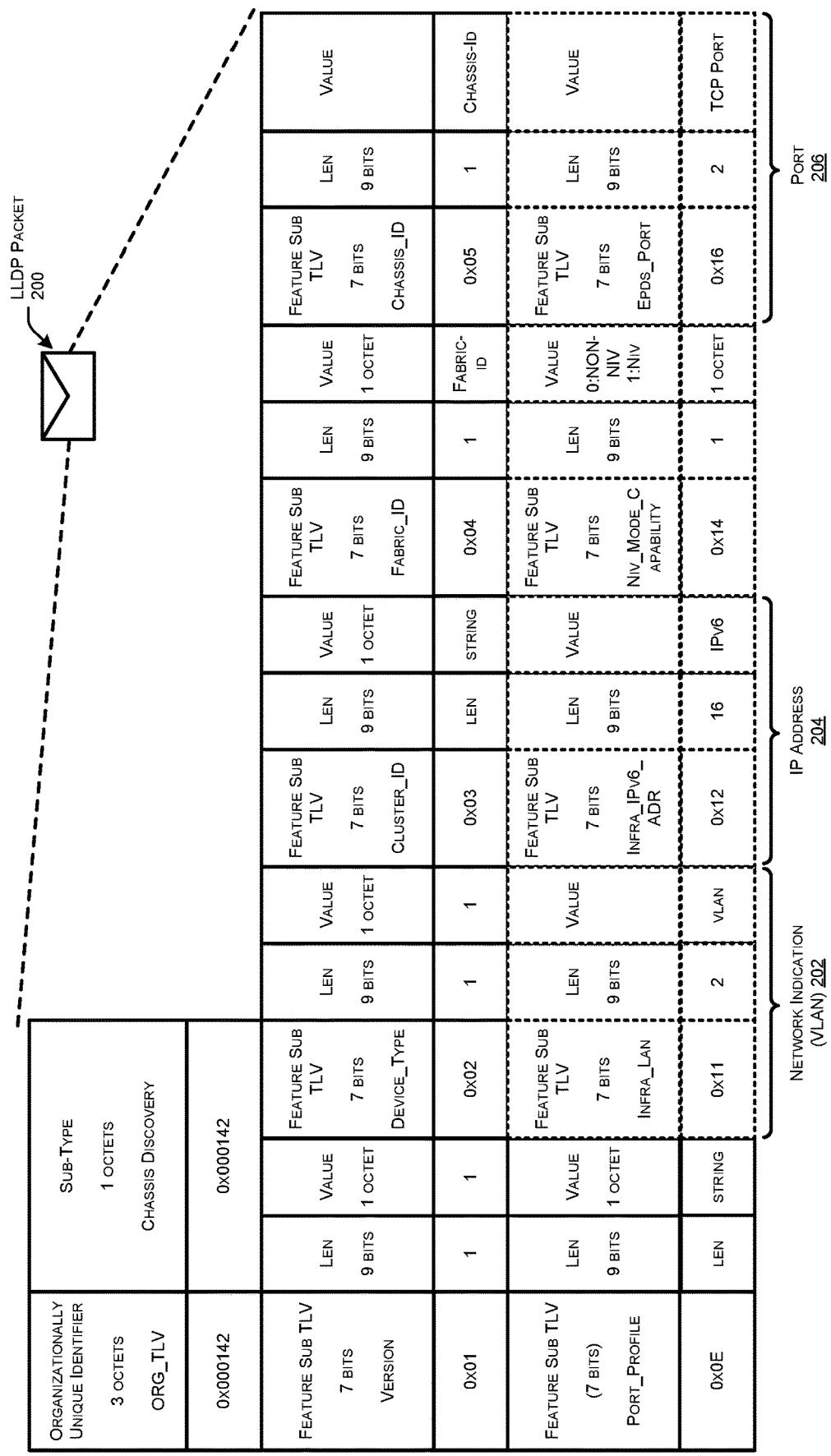
FIG. 2 illustrates an example Link Local Discovery Protocol (LLDP) packet having one or more Type-Length-Values (TLVs) or sub-TLVs that convey contact information for communicating with an endpoint discovery service associated with a switched fabric.

FIG. 2 illustrates an example Link Local Discovery Protocol (LLDP) packet 200 having one or more Type-Length-Values (TLVs) or sub-TLVs that convey contact information for communicating with an endpoint discovery service associated with a switched fabric.

Generally, the LLDP packet 200 (or packets) may be used to advertise identity information, connectivity information, capability information, and/or other information with other devices. Generally, each LLDP packet 200 may be sent between devices from each of their interfaces at a fixed interval in the form of Ethernet frames. Each Ethernet frame contains one LLDP Data Unit (LLDPDU) that is a sequence of type-length value (TLV) structures.

According to the techniques described herein, an LLDP mechanism may be used and/or modified such that TLVs (and/or sub-TLVs) can be used in the LLDP packet 200 to provide information for contacting the discovery service 120. As illustrated, the LLDP packet 200 may include a sub-TLV that includes a network indication (VLAN) 202 over which the discovery service 120 may be reached, a sub-TLV that indicates an IP address 204 at which the discovery service 120 may be reached, and a sub-TLV that indicates a port 206 on which the discovery service may be reached.

Thus, sub-TLVs and/or TLVs may be used to propagate connectivity information for a server 112/116 to contact a discovery service 120 in order to get connectivity information to connect to the cloud management platform 106. Although not illustrated, a similar extension may be made to the SDP for communicating with the FI 108 and blade servers 116 in instances where SDP is utilized.

Figure 3:
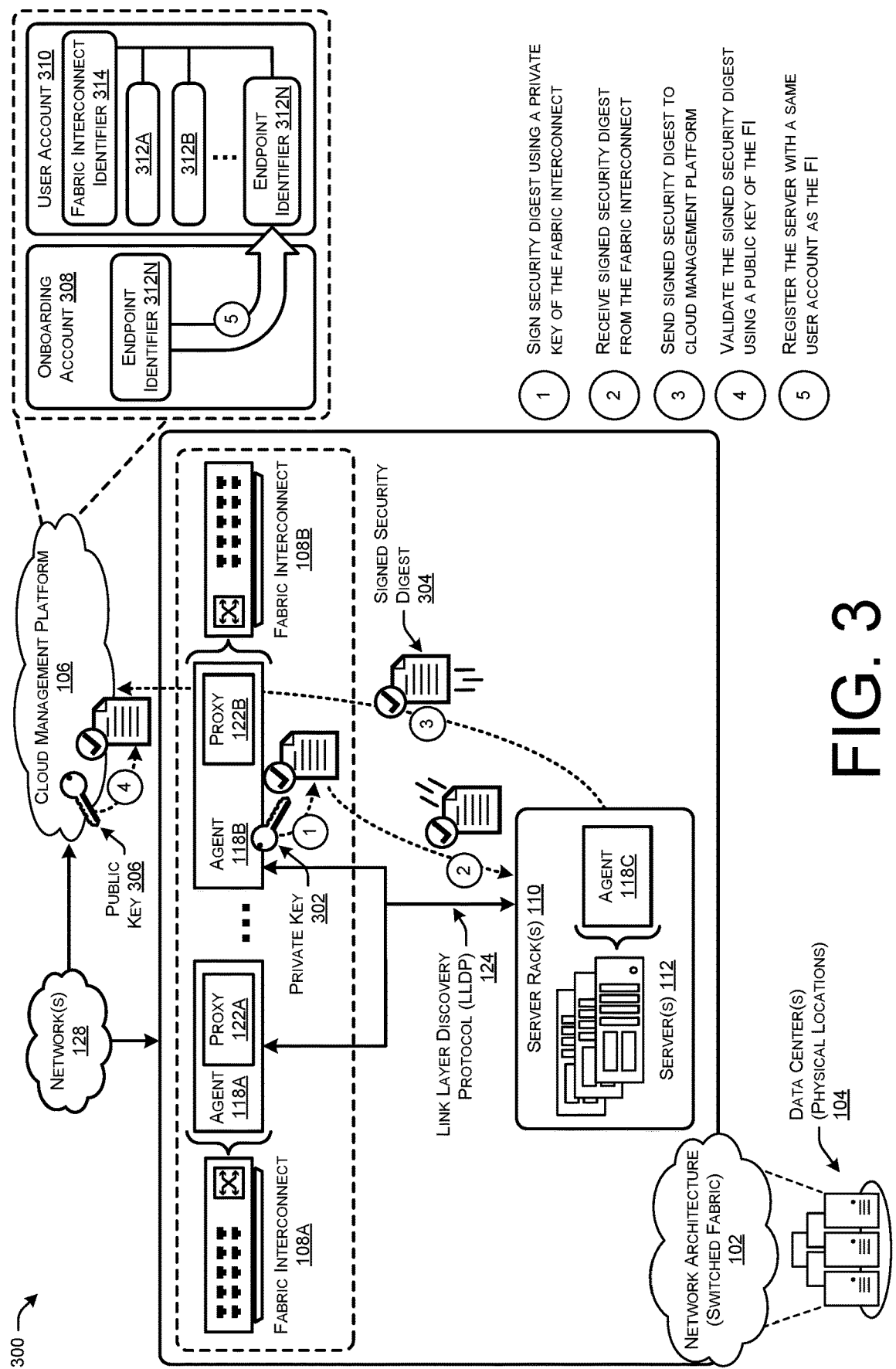
FIG. 3 illustrates a system-architecture diagram of an example switched fabric in which server devices are automatically provisioned, configured, and onboarded with a cloud management platform.

FIG. 3 illustrates a system-architecture diagram 300 of an example switched fabric in which server devices are automatically provisioned, configured, and onboarded with the cloud management platform 102. The techniques for FIG. 3 streaming device claim processes for devices that are attached to a clustered pair of FIs 108 that form a domain.

The agents 118C running on devices connected to the FIs 108 are considered as child-agents. The logical agent 118A/118B running on a clustered pair of FIs 108 is considered as the parent-agent 118C. The child-agents 118O receive an advertisement from FI 108 via LLDP or DCBX TLV containing the FI agent's P address, Port number, and Infra VLAN over which to communicate to the FI-agent 118A/118B (described with respect to FIG. 1 and FIG. 2).

Upon startup, child-agent 118C requests "parent configuration" from the FI-agent 118A/118B. The parent configuration includes the cloud management platform 106 DNS (which could be cloud or appliance), FI proxy IP/port, parent-agent 118 unique identifier (e.g., unique identifier of parent agent in cloud management platform 106) and a time-bound security digest 304 signed by the private key 302 of the parent-agent 118.

At "1," the agent 118B running on a fabric interconnect 108B may use a private key 302 to sign a security digest and create a signed security digest 304. In some instances, the server 112 (e.g., child) may request the parent configuration information from the FI 108, and the FI 108 may provide the signed security digest 304 to the server 112 at "2." In other examples, the signed security digest 304 may be provided to the server 112 in response to the get parent request's response.

At "3," the server 112 (e.g., agent 118C) may send the signed security digest 304 to the cloud management platform 106 as a means to authenticate itself with the cloud management platform and to inherit connectivity information from the fabric interconnect 108. The connectivity information in the signed security digest 304 is used to connect to the DNS of the cloud management platform 106 via the proxy 122B, and the signed security digest 304 is also used to authenticate the server 112 as in fact being a child device to the FI 108B. The child-agent's 118O device (e.g., server 112, IOM, etc) is directly attached to the parent-agent's 118B device (FI 108B) and only the child-agent 118C can gain access to the parent configuration.

At "4," the cloud management platform 106 may authenticate the child-agent's 118O connection request by using the public key 306 of the parent-agent 118B to validate the child-agent's 118O security digest 304. At this point, the child-agent 118C is registered and automatically claimed directly into the user account 310 (and/or in some examples from an onboarding account 308) of the parent-agent 118C, as illustrated, an endpoint identifier 312N (corresponding to the server 112 agent 118C) may be moved from a general onboarding account 308 and into the same user account 310 as the fabric interconnect identifier 314 (e.g., corresponding to the FI 108B/agent 118B), In this way, the signed security digest 304, which may be time-bound, can be used to distribute connectivity information for endpoints to connect to the cloud management platform, and also a way to authenticate themselves as indeed being children to a FI 108B by having a signed piece of data that is verifiable by the cloud management platform 106 as being signed by a particular FI 108.

Figure 4:
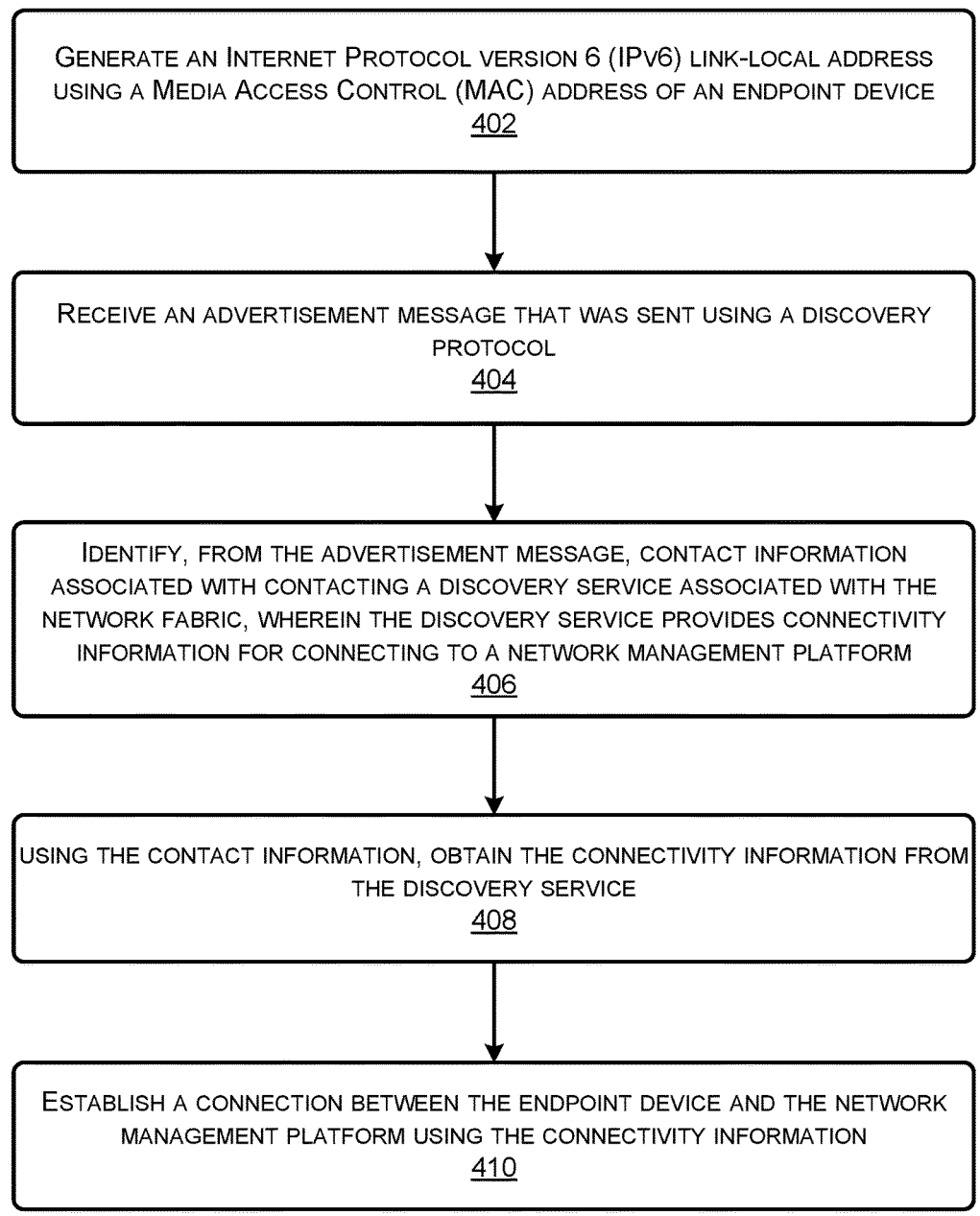
FIG. 4 illustrates a flow diagram of an example method for automatically provisioning and configuring an endpoint for management by a cloud management platform.

FIGS. 4 and 5 illustrate flow diagrams of example methods that illustrate various aspects of the techniques of this disclosure. The logical operations described herein with respect to FIGS. 4 and 5 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 4 and 5 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 4 illustrates a flow diagram of an example method 400 for automatically provisioning and configuring an endpoint for management by a cloud management platform.

At 402, an endpoint may generate an Internet Protocol version 6 (IPv6) link-local address using a Media Access Control (MAC) address of the endpoint device. That is, the endpoint may self-assign an IPv6 link-local address using its own MAC address such that there will not be overlapping IPv6 local-link addresses in the local domain of the endpoint.

At 404, the endpoint device (e.g., server, blade server, IOM, etc.) may receive an advertisement message that was sent using a discovery protocol. In some instances, the discovery protocol is LLDP, SDP, and/or any other type of discovery protocol.

At 406, the endpoint device may identify, from the advertisement message, contact information associated with contacting a discovery service associated with the network fabric. Generally, the discovery service 120 provides connectivity information for connecting to a cloud management platform 106. The contact information may include an indication of a network (e.g., VLAN) usable to connect to the discovery service 120, an IP address associated with the discovery service 120, and an indication of a port of the discovery service 120.

At 408, the endpoint may, using the contact information, obtain the connectivity information from the discovery service. At 410, the endpoint may establish a connection with the cloud management platform using the connectivity information.

In some instances, the method 400 may further include receiving, from the fabric interconnect, a signed security digest that has been signed by a private key associated with the fabric interconnect, and sending the signed security digest from the endpoint to the cloud management platform for authentication as being connected to the fabric interconnect.

FIG. 5 illustrates a flow diagram of an example method 500 for automatically provisioning, configuring, and onboarding an endpoint with a cloud management platform.

At 502, an endpoint (e.g., server, blade server, IOM, etc.) may receive, from a fabric interconnect, an advertisement message that was sent using a discovery protocol. The discovery protocol may be LLDP, SDP, and/or any other discovery protocol running at any layer.

At 504, the endpoint may receive, from the fabric interconnect, a signed security digest that has been signed by a private key associated with the fabric interconnect. In some instances, the signed security digest may include, be included with, or otherwise be associated with the advertisement message.

At 506, the endpoint may identify, from the advertisement message, contact information associated with contacting a discovery service associated with the network fabric. Generally, the discovery service provides connectivity information for connecting to a cloud management platform 106. The contact information may includes an indication of a network usable to connect to the discovery service, an Internet Protocol (IP) address associated with the discovery service, and an indication of a port of the discovery service.

At 508, the endpoint may, using the contact information, obtain the connectivity information from the discovery service. For instance, the endpoint may reach out to the discovery service running in the fabric to obtain connectivity information for connecting to the cloud management platform 106.

At 510, the endpoint may establish a connection with the cloud management platform using the connectivity information, such as by using one or more proxies and/or a tunneling protocol (e.g., SSL, TLS, etc.).

At 512, the endpoint may send the signed security digest to the cloud management platform. The cloud management platform 106 may then use a public key of the fabric interconnect to verify that the signed security digest was signed using a private key of the fabric interconnect. The cloud management platform may then automatically register the endpoint with the user account of the fabric interconnect. In this way, endpoints are automatically onboarded into the appropriate user accounts without manual user intervention.

Figure 6:
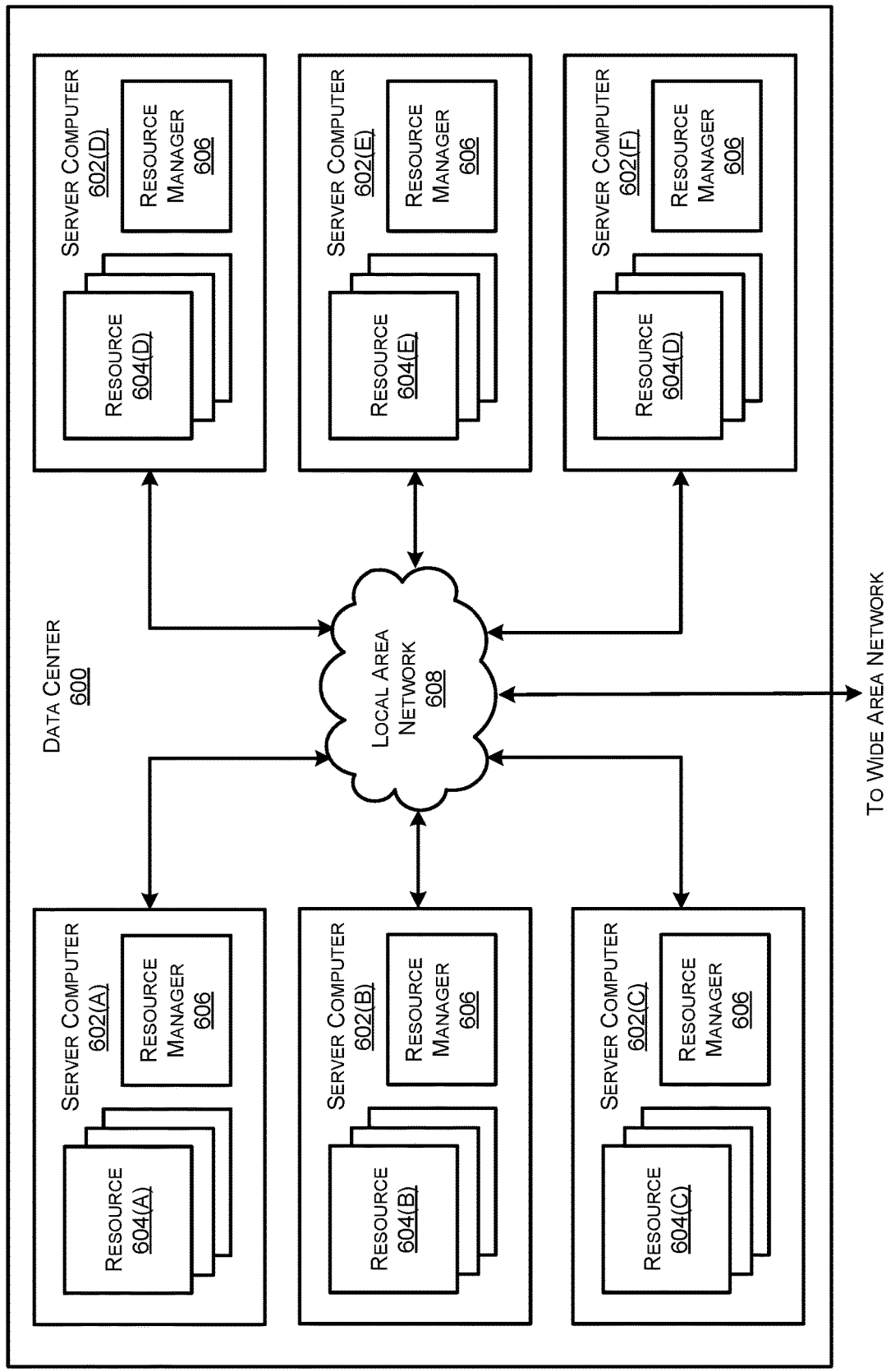
FIG. 6 illustrates a computing system diagram illustrating a configuration for a data center that can be utilized to implement aspects of the technologies disclosed herein.

FIG. 6 illustrates a computing system diagram illustrating a configuration for a data center 600 that can be utilized to implement aspects of the technologies disclosed herein. The example data center 600 shown in FIG. 6 includes several server computers 602A-602F (which might be referred to herein singularly as "a server computer 602" or in the plural as "the server computers 602") for providing computing resources. In some examples, the resources and/or server computers 602 may include, or correspond to, the any type of networked device described herein. Although described as servers, the server computers 602 may comprise any type of networked device, such as servers, switches, routers, hubs, bridges, gateways, modems, repeaters, access points, etc.

The server computers 602 can be standard tower, rack-mount, or blade server computers configured appropriately for providing computing resources. In some examples, the server computers 602 may provide computing resources 604 including data processing resources such as VM instances or hardware computing systems, database clusters, computing clusters, storage clusters, data storage resources, database resources, networking resources, VPNs, and others. Some of the servers 602 can also be configured to execute a resource manager 606 capable of instantiating and/or managing the computing resources. In the case of VM instances, for example, the resource manager 606 can be a hypervisor or another type of program configured to enable the execution of multiple VM instances on a single server computer 602. Server computers 602 in the data center 600 can also be configured to provide network services and other types of services.

In the example data center 600 shown in FIG. 6, an appropriate LAN 608 is also utilized to interconnect the server computers 602A-602F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 600, between each of the server computers 602A-602F in each data center 600, and, potentially, between computing resources in each of the server computers 602. It should be appreciated that the configuration of the data center 600 described with reference to FIG. 6 is merely illustrative and that other implementations can be utilized.

In some examples, the server computers 602 and or the resources 604 may each execute/host one or more tenant containers and/or virtual machines to perform techniques described herein.

In some instances, the data center 600 may provide computing resources, like tenant containers, VM instances, VPN instances, and storage, on a permanent or an as-needed basis. Among other types of functionality, the computing resources provided by a cloud computing network may be utilized to implement the various services and techniques described above. The computing resources 604 provided by the cloud computing network can include various types of computing resources, such as data processing resources like tenant containers and VM instances, data storage resources, networking resources, data communication resources, network services, VPN instances, and the like.

Each type of computing resource 604 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 604 not mentioned specifically herein.

The computing resources 604 provided by a cloud computing network may be enabled in one embodiment by one or more data centers 600 (which might be referred to herein singularly as "a data center 600" or in the plural as "the data centers 600"). The data centers 600 are facilities utilized to house and operate computer systems and associated components. The data centers 600 typically include redundant and backup power, communications, cooling, and security systems. The data centers 600 can also be located in geographically disparate locations. One illustrative embodiment for a data center 600 that can be utilized to implement the technologies disclosed herein will be described below with regard to FIG. 6.

Figure 7:
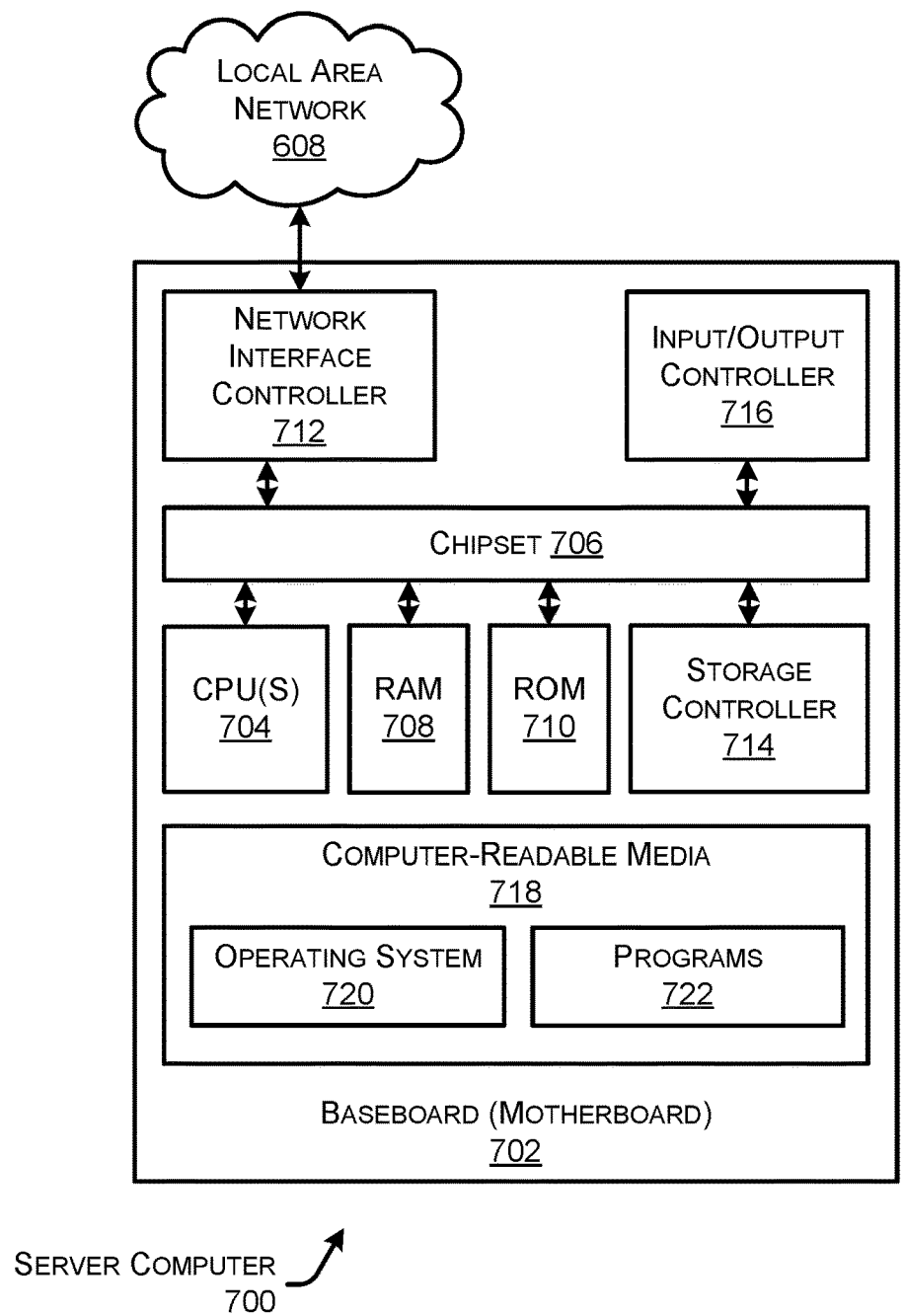
FIG. 7 illustrates a computer architecture diagram showing an example computer hardware architecture for implementing a computing device that can be utilized to implement aspects of the various technologies presented herein.

FIG. 7 illustrates a computer architecture diagram showing an example computer hardware architecture 700 for implementing a computing device that can be utilized to implement aspects of the various technologies presented herein. The computer hardware architecture 700 may be a conventional server computer, computing resource, network device (e.g., router, load balancer, data store, etc.), workstation, desktop computer, laptop, tablet, network appliance, e-reader, smartphone, or other computing device, and can be utilized to execute any of the software components presented herein. The computer 700 may, in some examples, correspond to at least one of a server 112, a blade server/component 116, and/or a system of computers 700 may make up the cloud management platform 106. The computer 700 may comprise networked devices such as servers, switches, routers, hubs, bridges, gateways, modems, repeaters, access points, etc.

The computer 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through a network, such as the network 106. The chipset 706 can include functionality for providing network connectivity through a Network Interface Controller (NIC) 712, such as a gigabit Ethernet adapter. The NIC 712 is capable of connecting the computer 700 to other computing devices over the network 106. It should be appreciated that multiple NICs 712 can be present in the computer 700, connecting the computer to other types of networks and remote computer systems. In some examples, the NIC 712 may be configured to perform at least some of the techniques described herein, such as packet redirects and/or other techniques described herein.

The computer 700 can be connected to a storage device 718 that provides non-volatile storage for the computer. The storage device 718 can store an operating system 720, programs 722, and data, which have been described in greater detail herein. The storage device 718 can be connected to the computer 700 through a storage controller 714 connected to the chipset 706. The storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the computer 700 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the storage device 718 by detecting the physical states or characteristics of one or more particular locations within the physical storage units.

In addition to the mass storage device 718 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700. In some examples, the operations performed by the network 106 and or any components included therein, may be supported by one or more devices similar to computer 700. Stated otherwise, some or all of the operations performed by the servers 112, blade servers 116, and or any components included therein, may be performed by one or more computer devices 700 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the computer 700. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 718 can store other system or application programs and data utilized by the computer 700.

In one embodiment, the storage device 718 or other computer-readable storage media is encoded with computer-executable instructions which, when loaded into the computer 700, transform the computer from a general-purpose computing system into a special-purpose computer capable of implementing the embodiments described herein. These computer-executable instructions transform the computer 700 by specifying how the CPUs 704 transition between states, as described above. According to one embodiment, the computer 700 has access to computer-readable storage media storing computer-executable instructions which, when executed by the computer 700, perform the various processes described above with regard to FIGS. 1-5. The computer 700 can also include computer-readable storage media having instructions stored thereupon for performing any of the other computer-implemented operations described herein.

The computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computer 700 might not include all of the components shown in FIG. 7, can include other components that are not explicitly shown in FIG. 7, or might utilize an architecture completely different than that shown in FIG. 7.

As described herein, the computer 700 may comprise one or more of a server 112, a blade server 116, or a system of devices that make up the cloud management platform 106 or a network device (e.g., server computer, computing resource, etc.). The computer 700 may include one or more hardware processors 704 (processors) configured to execute one or more stored instructions. The processor(s) 704 may comprise one or more cores. Further, the computer 700 may include one or more network interfaces configured to provide communications between the computer 700 and other devices, such as the communications described herein as being performed by the client devices 106 and computing resources 114 The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 722 may comprise any type of programs or processes to perform the techniques described in this disclosure for determining connectivity in multi-hop paths using BFD Echo packet(s). The programs 722 may enable the computing resources 114 and/or the load balancers 112 of the computing resources 114 to perform various operations.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A computer-implemented method for provisioning an endpoint device connected to a fabric interconnect in a network fabric, the computer-implemented method comprising:
  generating, at the endpoint device, an Internet Protocol version 6 (IPv6) link-local address using a Media Access Control (MAC) address of the endpoint device;
  receiving, at the endpoint device, an advertisement message that was sent using a discovery protocol;
  identifying, from the advertisement message, contact information associated with contacting a discovery service associated with the network fabric, wherein the discovery service provides connectivity information for connecting to a cloud management platform;
  using the contact information, obtaining the connectivity information from the discovery service; and
  establishing a connection between the endpoint device and the cloud management platform using the connectivity information.

2. The computer-implemented method of claim 1, wherein the contact information includes:
  an indication of a network usable to connect to the discovery service;
  an IP address associated with the discovery service; and
  an indication of a port of the discovery service.

3. The computer-implemented method of claim 1, wherein:
  the fabric interconnect is a switch in the network fabric;
  the endpoint device is a server connected to the switch;
  the discovery protocol is a Link-Layer Discovery Protocol (LLDP) and the advertisement message is an LLDP packet; and
  the contact information is included in one or more sub-Type-Length-Values (sub-TLVs) included in the LLDP packet.

4. The computer-implemented method of claim 1, wherein:
  the endpoint device is an Input/Output Module (IOM) fabric extender that is associated with the network fabric;
  the discovery protocol is a Satellite Discovery Protocol (SDP); and
  the contact information is included in an extension in packets sent via the SDP.

5. The computer-implemented method of claim 1, wherein the discovery service is running on the fabric interconnect.

6. The computer-implemented method of claim 1, further comprising:
  receiving, from the fabric interconnect, a signed security digest that has been signed by a private key associated with the fabric interconnect; and
  sending the signed security digest from the endpoint to the cloud management platform.

7. The computer-implemented method of claim 6, further comprising:
  receiving, at the cloud management platform, a first request to register the fabric interconnect with a user account associated with the cloud management platform;
  storing a first indication of the fabric interconnect in an onboarding account associated with the cloud management platform;
  receiving input from the user account indicating that the fabric interconnect is to be registered with the user account;
  receiving, at the cloud management platform, a second request to register the endpoint with the user account and as being connected to the fabric interconnect, the second request including the signed security digest;
  storing a second indication of the endpoint in the onboarding account associated with the cloud management platform;
  validating, using a public key associated with the fabric interconnect, that the signed security digest was signed using the private key of the fabric interconnect; and
  moving the second indication of the endpoint to the user account such that the endpoint is registered with the user account.

8. A system comprising an endpoint device connected to a fabric interconnect in a network fabric, the endpoint device comprising:
  one or more processors; and
  one or more non-transitory computer-readable media storing instructions that, when executed by the one or more processors, cause the one or more processors to perform operations comprising:
    receiving an advertisement message that was sent from the fabric interconnect using a discovery protocol;
    identifying, from the advertisement message, contact information associated with contacting a discovery service associated with the network fabric, wherein the discovery service provides connectivity information for connecting to a cloud management platform, wherein the contact information includes:
      an indication of a network usable to connect to the discovery service; an Internet Protocol (IP) address associated with the discovery service; and an indication of a port of the discovery service;
    using the contact information, obtaining the connectivity information from the discovery service; and
    establishing a connection between the endpoint device and the cloud management platform using the connectivity information.

9. The system of claim 8, the operations further comprising:
  generating, at the endpoint device, an IP version 6 (IPv6) link-local address using a Media Access Control (MAC) address of the endpoint device; and
  providing the IPv6 link-local address to obtain the cloud management platform.

10. The system of claim 8, wherein:
  the fabric interconnect is a switch in the network fabric;
  the endpoint device is a server connected to the switch;
  the discovery protocol is a Link-Layer Discovery Protocol (LLDP) and the advertisement message is an LLDP packet; and
  the contact information is included in one or more sub-Type-Length-Values (sub-TLVs) included in the LLDP packet.

11. The system of claim 8, wherein:
  the endpoint device is an Input/Output Module (IOM) fabric extender that is associated with the network fabric;
  the discovery protocol is a Satellite Discovery Protocol (SDP); and the contact information is included in an extension in packets sent via the SDP.

12. The system of claim 8, wherein the discovery service is running on the fabric interconnect.

13. The system of claim 8, the operations further comprising:
receiving, from the fabric interconnect, a signed security digest that has been signed by a private key associated with the fabric interconnect; and
sending the signed security digest from the endpoint to the cloud management platform.

14. The system of claim 13, further comprising the cloud management platform comprising
one or more second processors; and
one or more second non-transitory computer-readable media storing instructions that, when executed by the one or more second processors, cause the one or more second processors to perform second operations comprising:
receiving a first request to register the fabric interconnect with a user account associated with the cloud management platform;
storing a first indication of the fabric interconnect in an onboarding account associated with the cloud management platform;
receiving input from the user account indicating that the fabric interconnect is to be registered with the user account;
receiving, at the cloud management platform, a second request to register the endpoint with the user account and as being connected to the fabric interconnect, the second request including the signed security digest;
storing a second indication of the endpoint in the onboarding account associated with the cloud management platform;
validating, using a public key associated with the fabric interconnect, that the signed security digest was signed using the private key of the fabric interconnect; and
moving the second indication of the endpoint to the user account such that the endpoint is registered with the user account.

15. An endpoint device that is connected to a fabric interconnect in a network fabric, the endpoint device comprising:
one or more processors; and
one or more non-transitory computer-readable media storing instructions that, when executed by the one or more processors, cause the one or more processors to perform operations comprising:
receiving, from the fabric interconnect, an advertisement message that was sent using a discovery protocol;
receiving, from the fabric interconnect, a signed security digest that has been signed by a private key associated with the fabric interconnect;
identifying, from the advertisement message, contact information associated with contacting a discovery service associated with the network fabric, wherein the discovery service provides connectivity information for connecting to a cloud management platform;
using the contact information, obtaining the connectivity information from the discovery service;
establishing a connection between the endpoint device and the cloud management platform using the connectivity information; and
sending the signed security digest to the cloud management platform.

16. The endpoint device of claim 15, the operations further comprising:
generating an Internet Protocol version 6 (IPv6) link-local address using a Media Access Control (MAC) address of the endpoint device;
providing the IPv6 link-local address to obtain the cloud management platform.

17. The endpoint device of claim 15, wherein the contact information includes:
an indication of a network usable to connect to the discovery service;
an Internet Protocol (IP) address associated with the discovery service; and
an indication of a port of the discovery service.

18. The endpoint device of claim 15 wherein:
the fabric interconnect is a switch in the network fabric;
the endpoint device is a server connected to the switch;
the discovery protocol is a Link-Layer Discovery Protocol (LLDP) and the advertisement message is an LLDP packet; and
the contact information is included in one or more sub-Type-Length-Values (sub-TLVs) included in the LLDP packet.

19. The endpoint device of claim 15 wherein:
the endpoint device is an Input/Output Module (IOM) fabric extender that is associated with the network fabric;
the discovery protocol is a Satellite Discovery Protocol (SDP); and
the contact information is included in an extension in packets sent via the SDP.

20. The endpoint device of claim 15, wherein the discovery service is running on the fabric interconnect.

* * * * *